Feb. 18, 1930. J. G. BENNETT ET AL 1,748,033
CONVEYER CHAIN
Filed Feb. 28, 1928  2 Sheets-Sheet 1
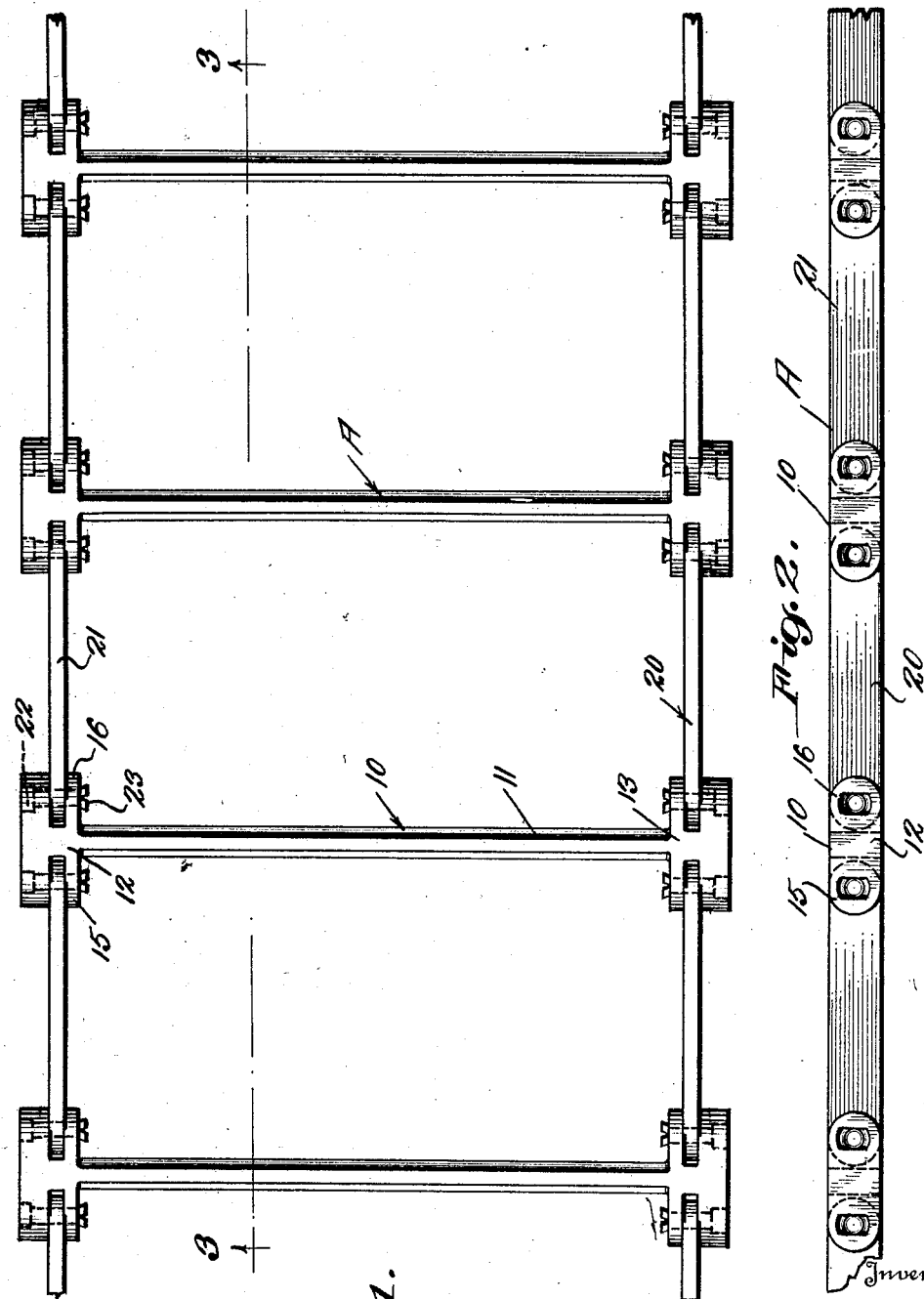
Witness
C. E. Churchman Jr.
Inventors
James G. Bennett
Hans Ostby
By Irving L. McCathran
Attorney

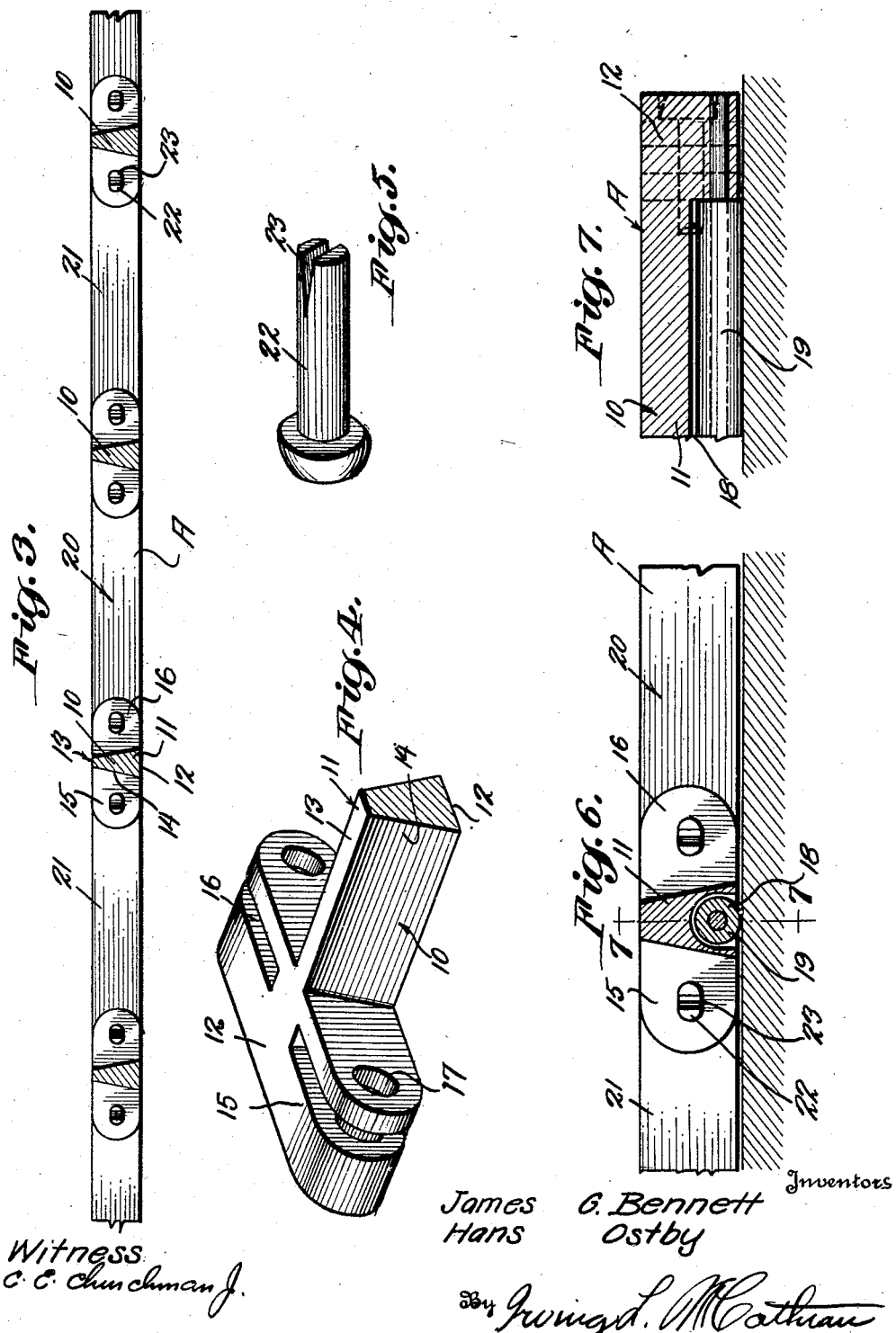

Patented Feb. 18, 1930

1,748,033

UNITED STATES PATENT OFFICE

JAMES G. BENNETT AND HANS OSTBY, OF SNOQUALMIE FALLS, WASHINGTON

CONVEYER CHAIN

Application filed February 28, 1928. Serial No. 257,585.

This invention appertains to conveyers and more particularly to an improved conveyer chain.

One of the primary objects of the present invention is to provide a conveyer chain of simple and durable construction, in which undue strain thereon is entirely eliminated and the strain effectively distributed so as to permit the chain to carry a maximum amount of load.

Another salient object of the invention is to provide a conveyer chain link including a body portion arranged to extend transversely of the chain having integrally connected with the terminals thereof ears for the reception of the connecting straps, the body portion being so formed as to permit the effective engagement thereof with the conveyer drums or sprockets and at the same time to effectively carry the load.

A further object of the invention is to provide a conveyer chain link which can be either cast or drop forged, having a body portion of substantially truncated triangular formation in cross section with the widest portion thereof disposed lowermost for engagement with the conveyer drums or sprockets and with the conveyer bed.

A further object of the invention is the provision of means for reducing the friction between the conveyer links and the other parts of the conveyer, such as the bed thereof, the wide base portion of the links being provided with an anti-friction roller for engaging the bed.

A still further object of the invention is to provide a novel conveyer chain of the above character, which will be efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, in which drawings:

Figure 1 is a fragmentary top plan view of the improved conveyer chain;

Figure 2 is a fragmentary side or edge elevation thereof;

Figure 3 is a longitudinal section taken on the line 3—3 of Figure 1 looking in the direction of the arrows;

Figure 4 is a fragmentary detail perspective view of the improved conveyer chain link;

Figure 5 is a perspective view of the bolts utilized for connecting the links and the connecting straps together;

Figure 6 is a fragmentary longitudinal sectional view illustrating a preferred form of the links; and Figure 7 is a section through one of the links, showing the preferred form thereof, taken on the line 7—7 of Figure 6.

Referring to the drawings in detail, wherein similar reference characters designate corresponding parts throughout the several views, the letter A generally indicates the improved conveyer chain, which comprises a plurality of novel links 10 and means 20 for connecting the same together.

The formation of the links 10 forms the salient features of the present invention and each of the links can be cast or drop forged and made of any desired material possessing the necessary tensile strength such as steel or manganese. The links each include a body portion 11 which extends transversely of the chain and end pieces 12 and 13. It is to be noted that the end pieces 12 and 13 project laterally from the opposite sides of the body 11 equi-distantly and form in connection therewith a substantially I-shaped member in plan. The link body 11 is substantially triangular shaped in cross section, having a relatively wide base portion 12 and a relatively narrow top face 13 and inclined or downwardly beveled side faces 14. By this construction we are permitted to obtain a double action and prevent undue stress upon the conveyer chain. The end pieces 12 and 13 are formed, preferably, integrally with the body 11 and the ends thereof are bifurcated vertically to provide pairs of pivot ears 15 and 16 and these ears are provided with bolt or pivot pin receiving openings 17.

The links 10 are connected together by the novel means 20 which includes side straps 21 which are preferably formed from the same material as the links 10. The ends of these straps 21 are received in the bifurcated portions or ears 15 and 16 of the adjacent links and are provided with openings which register with the openings 17 in the ears.

Headed bolts 22 are inserted through a strap and opening 17 in the ears and the ends of the bolts which are opposite the heads can be slotted as at 23 and bent back or spread apart, similar to a cotter pin for preventing accidental displacement of the straps from the ears.

The chains are adapted to travel over the sprockets or drums of the conveyer, while the enlarged base portions 12 of the links rest upon the bed of the conveyer and in view of the formation of the bases of the links there will be no strain on the chain, only the load on top of the chain.

In Figures 6 and 7 we have shown the preferred form of our invention and in this form the body portions 11 of the links at the bases thereof are hollowed out as at 18 for the reception of a roller bearing 19 which can be held in place in any desired way, such as by a suitable pivot pin. The lower face of the roller bearing projects slightly below the lower face of the body portion of the links so as to have a subtantially anti-frictional engagement with the bed of the conveyer.

From the foregoing description, it can be seen that we have provided a conveyer chain of exceptionally simple and durable construction in which the links are so constructed as to effectively cooperate with the conveyer sprockets or drums and to prevent undue strain on the chains and permit the chains to carry a maximum amount of load.

Changes in details may be made without departing from the spirit or the scope of this invention, but:

What we claim as new is:

A conveyer chain link comprising an elongated body of a truncated triangular shape in cross section having its widest portion disposed lowermost, said widest portion having the lower face thereof provided with a longitudinally extending recess, and a roller bearing in said recess projecting slightly beyond the said wide face.

In testimony whereof we affix our signatures.

JAMES G. BENNETT.
HANS OSTBY.